United States Patent [19]

Stange et al.

[11] 3,984,098
[45] Oct. 5, 1976

[54] PNEUMATIC REGISTRATION AND CLAMPING APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[22] Filed: Nov. 28, 1975

[21] Appl. No.: 635,999

[52] U.S. Cl............................. 271/236; 271/245; 271/195
[51] Int. Cl.² ........................................ B65H 9/00
[58] Field of Search ............... 226/7, 97; 271/234, 271/235, 236, 238, 243, 244, 245, 264, 195; 100/214; 355/75, 76

[56] References Cited
UNITED STATES PATENTS

| | | | |
|---|---|---|---|
| 3,624,807 | 11/1971 | Schwebel | 271/236 |
| 3,653,568 | 4/1972 | Cronquist | 271/195 X |
| 3,918,706 | 11/1975 | Craft | 271/250 |
| 3,926,426 | 12/1975 | Toriumi | 271/236 X |

*Primary Examiner*—Richard A. Schacher

[57] ABSTRACT

In a first embodiment, a stop having a plurality of ports is connected to and covers an end of a rectangular sleeve having a movable wide wall. In a region near the stop, a narrow wall of the sleeve also has a plurality of ports. A nozzle coupled to a pump provides a flow of air into the other end of the sleeve and the air exits through the ports. With this arrangement, a rectangular sheet inserted into said other end of the sleeve is fluidly brought into registration with the narrow wall and stop. After the sheet has been registered, the movable wide wall is moved towards the other wide wall of the sleeve. If a sheet is wrinkled, such movement flattens the sheet. In a second embodiment, similar to the first, the narrow wall and stop include internal projections against which an inserted sheet is registered. In a third embodiment, similar to the first, a manifold is coupled to the ports and a vacuum pump is coupled to the manifold to accelerate registration. In a fourth embodiment, similar to the third, the pumps are replaced with a reversible pump to register and discharge a sheet.

15 Claims, 9 Drawing Figures

PNEUMATIC REGISTRATION AND CLAMPING APPARATUS

The subject invention generally relates to pneumatic transports and, in particular, to transports used to register articles carried thereby, such as disclosed in co-pending U.S. patent application Ser. No. 627,571, Pneumatic Registration Apparatus, filed Oct. 31, 1975, on an invention by Klaus K. Strange, and co-pending U.S. patent application Ser. No. 636,336, Three-Way Pneumatic Registration Apparatus, filed on Nov. 28, 1975, on an invention by Klaus K. Strange, et al, both applications being assigned to the assignee herein, Xerox Corporation.

The use of fluid to move articles into registration with stops is a part of the public prior art which is relevant herein. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduit or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a flat data storage card. Air pressure and vacuum pressure are switched between opposite ends of the chamber to reciprocally move the card rectilinearly in the chamber. A magnetic reading head extends through a hole in one wall of the chamber, and a recess is oppositely disposed on the other wall. As a result, when the card is moved the card is slightly deflected from its trajectory, and the head remains in contact with one side of the card. The engagement may be used to read or write on the card.

It is noted that with the apparatus disclosed by Leigh D. Leiter, as fabric is advanced or when fabric which is smaller than the distance between nozzles is to be registered, some of the nozzles discharge into the surrounding air without having any effect on the fabric as it is moved into registration. Thus, pressurized air is wasted. In addition, it is noted that in the system disclosed by J. E. Smith, Jr., lateral registration is provided by the distance between walls of the chamber which are parallel to the direction of travel of the storage card. Thus, the system cannot be used with cards having different width dimensions. Further, it is noted that cards having various effective thicknesses, such as might be caused by wrinkles, cannot be used in the system.

It is an object of the present invention to provide apparatus for rapidly registering a sheet with respect to perpendicularly related axes and a surface, the sheet having any one of a range of sizes.

It is another object of the present invention to provide apparatus for efficiently moving a sheet into registration with perpendicularly related axes and a surface.

Briefly, the invention disclosed herein may be used for registering a sheet with respect to perpendicularly related axes, so long as the sheet has length, width, and effective thickness dimensions within predetermined ranges. Structurally, the invention may be implemented with (a) a sleeve for internally accommodating said sheet, the sleeve having a movable wide wall, and at least one point on an inner narrow wall of the sleeve being aligned in parallel with one of the axes; (b) a stop located at one end of the sleeve, the stop having at least one point aligned in parallel with the other of the axes; (c) means for providing in the sleeve a fluid stream having velocity components normal to each of the axes, whereby when a sheet is placed in the sleeve, the stream moves the sheet into abutment with each of said points; and (d) means for moving the movable wall to vary the thickness of the space in the sleeve, whereby sheets having different effective thicknesses may be registered and clamped in the sleeve.

Apparatus built according to the invention may be used to register flimsy sheets, such as thin paper, or wrinkled sheets. Advantageously, loose particles undesirably located on either side of the sheets are removed from the sheets during transportation.

Additional objects and features of the invention will become apparent by reference to the following description in conjunction with the accompanying drawings, in which.

Figure 1:
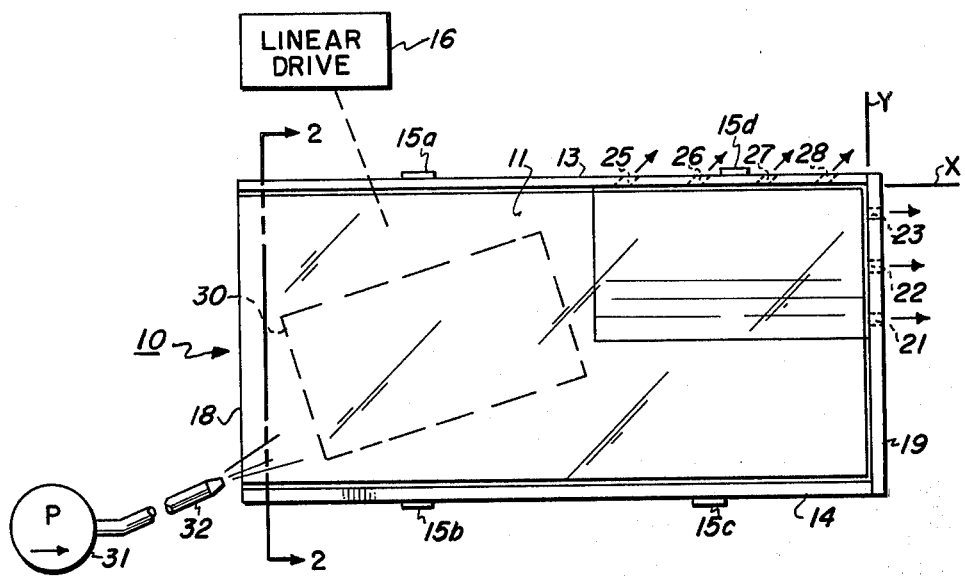
FIG. 1 is a schematic and top plan view of registration apparatus, according to the invention, a sheet being shown in a sleeve of the apparatus in an unregistered position (dotted lines) and in a registered position.
Figure 2:
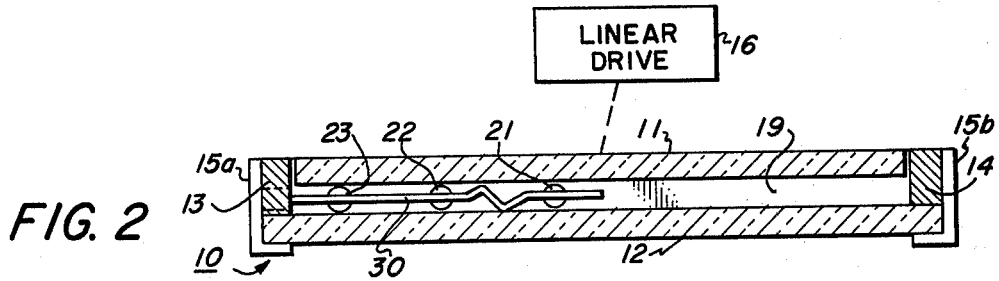
FIG. 2 is a cross-sectional view of the sleeve, taken along line 2—2 in FIG. 1.

Registration apparatus 10, according to the invention, is shown in FIGS. 1 and 2. Typically, the apparatus includes a rectangular plate 12 and a pair of spaced elongated rectangular members 13 and 14. Each of the members 13 and 14 extends from one narrow end of the plate, along a longitudinal end section, and abuts, at the other of its ends, a stop 19 extending along a section at the other narrow end of the plate. Brackets, only some of which are shown (15a–15d), secure the stop and elongated members 13 and 14 to plate 12. A linear drive mechanism 16, more fully described below, supports a rectangular plate 11 in sliding contact with the elongated members and stop. Plate 11 is supported in parallel with plate 12 and is movable with respect thereto to provide a sleeve having a variable space. The stop 19 includes a plurality of ports 21–23 communicating with the space in the sleeve. Elongated member 13 also includes a plurality of ports 25–28 communicating with the space in the sleeve, the ports in the stop and sleeve being located adjacent a common corner. The plate 12, the elongated members, and the stop are assembled in a fluid tight manner, so that fluid entering through the open end of the sleeve moves towards the common corner and exits through the ports. The stop is perpendicularly disposed with regard to the elongated members and, therefore, the common corner may be aligned with X and Y axes. In this embodiment, the top and bottom plates are maximally spaced from each other by approximately one-eighth of an inch, and a wrinkled sheet of paper 30 which is smaller than the length and width of the space in the sleeve may be inserted therein as is indicated by the dotted lines. If, thereafter, a pump 31 and nozzle 32 direct fluid into the open end of the sleeve, the fluid flow through the sleeve will move the sheet into registration at the common corner. After the sheet 30 moves into registration, plate 11 may be lowered to press out the wrinkles in the sheet and to bias the sheet against plate 12. When a registered sheet is flimsy, the fluid provided by nozzle 32 may cause it to flutter. However, fluttering is substantially reduced or eliminated when plate 11 is lowered. To move the sheet out of registration, plate 11 is moved away from plate 12 and a fluid stream may be injected into the sleeve through one or more of the ports in the stop 19. In this embodiment, the top and bottom plates are manufactured from glass. Thus, sheets brought into registration may be read, may be photographed, or may be scanned with equipment through plate 12. In this connection, if desired, plate 11 may include a reflective surface such as a white baked enamel to enhance copying processes. It should be noted that with the sheet in abutment with plate 12, photographic equipment may be of the type having a small depth of focus.

The registration apparatus disclosed above may be modified or supplemented in a number of ways, some of which are set forth below. In describing the various embodiments similar reference numerals will be used to designate components previously described.

Figure 3:
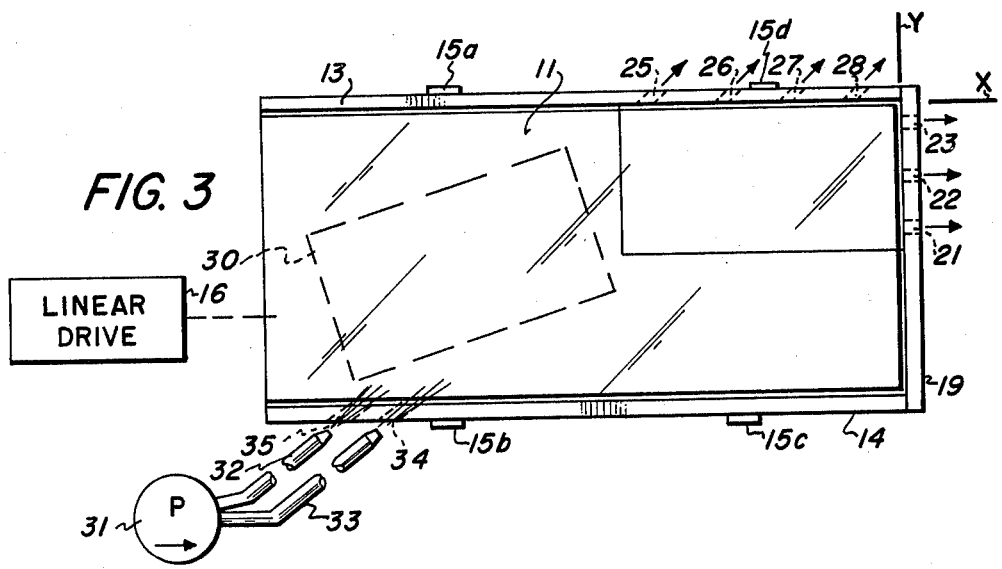
FIG. 3 is a schematic and top plan view of another embodiment of registration apparatus, according to the invention, a sheet being shown in a sleeve of the apparatus in an unregistered position (dotted line) and in a registered position.

Referring to FIGS. 1 and 3, it may be seen that the registration apparatus shown in FIG. 3 differs from that shown in FIG. 1 only in that ports 34 and 35 communicating with the sleeve are located on the elongated member 14 in an area adjacent the open end of the sleeve and that an additional nozzle 33 has been coupled to the pump. The nozzles are used to inject fluid through the ports in the elongated member for moving a sheet 30 inserted into the sleeve into a registered position. Although not shown, it will be appreciated by those skilled in the art that the nozzles may be replaced by a manifold coupling the pump to ports in elongated member 14. Further, a removable cover for closing the open end 18 after a sheet has been inserted may be provided to increase the speed with which a sheet is moved into registration. Primarily, this embodiment has been disclosed to make it clear that fluid for registering a sheet located in the sleeve need not be supplied through the open end of the sleeve.

Figure 4:
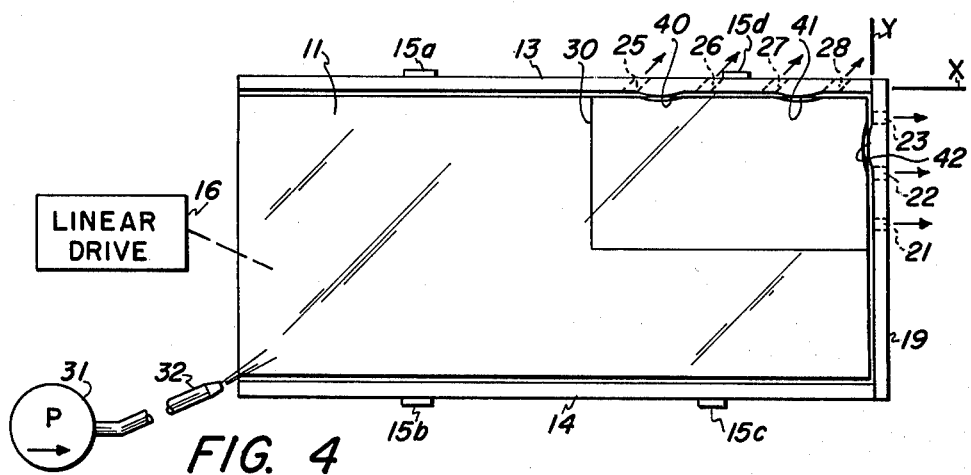
FIG. 4 is a schematic and top plan view of still another embodiment of registration apparatus, according to the invention, a sheet being shown in a sleeve of the apparatus in a registered position.

Referring to FIGS. 1 and 4, it may be seen that the registration apparatus shown in FIG. 4 differs from that shown in FIG. 1 only in that elongated member 13 includes projections 40 and 41 tangentially aligned with an X axis, the stop member includes a projection 42 tangentially aligned with a Y axis, and plate 11 is contoured to slidably engage the projections. These projections minimize the need for precise orthogonal alignment between the stop 19 and the elongated member 13 required to register a rectangular sheet. Alternatively, the projections improve registration when minor irregularities are present in sheets supplied for registration.

Figure 5:
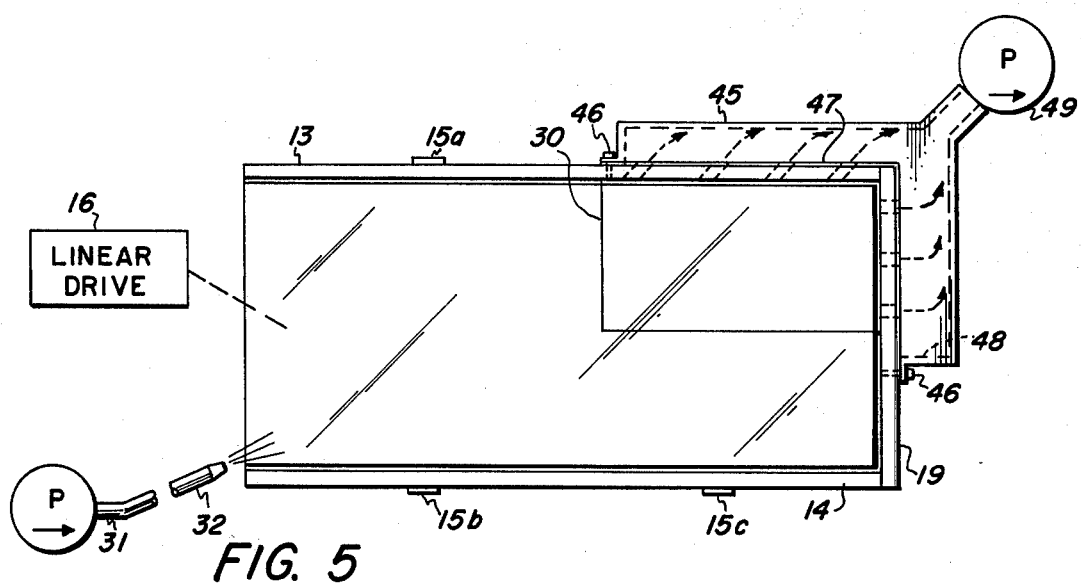
FIG. 5 is a schematic and top plan view of still another embodiment of registration apparatus, according to the invention, a sheet being shown in a sleeve of the apparatus in a registered position.
Figure 6:
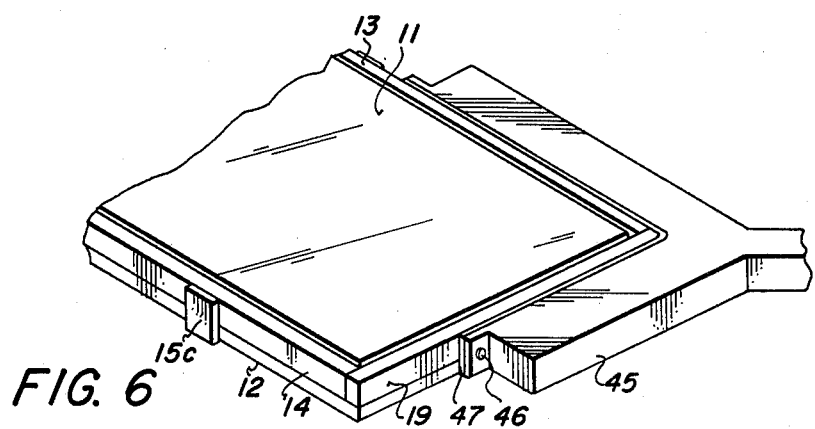
FIG. 6 is a partial perspective view of the sleeve shown in FIG. 5.

Referring to FIGS. 1, 5, and 6, it may be seen that the registration apparatus disclosed in FIGS. 5 and 6 differs from that shown in FIG. 1 in that a manifold 45 is fastened with screws 46 to the elongated member 13 and stop 19. A gasket 47 is interposed between the manifold 45 and the sleeve to prevent fluid leakage. The ports 25–28 in the elongated member and ports 21–23 in the stop communicate with a chamber 48 in the manifold, and the chamber in the manifold communicates with a vacuum pump 49. With this arrangement, the flow of fluid through the sleeve may be accelerated to more rapidly register sheets inserted through the open end of the sleeve. If desired, the pump 31 and nozzle 32 may be dispensed with, and the sheet may be registered with the vacuum pump 49. Thus, it may be seen that sheet 30 may be registered with a pressure pump, with a vacuum pump, or with both.

Figure 7:
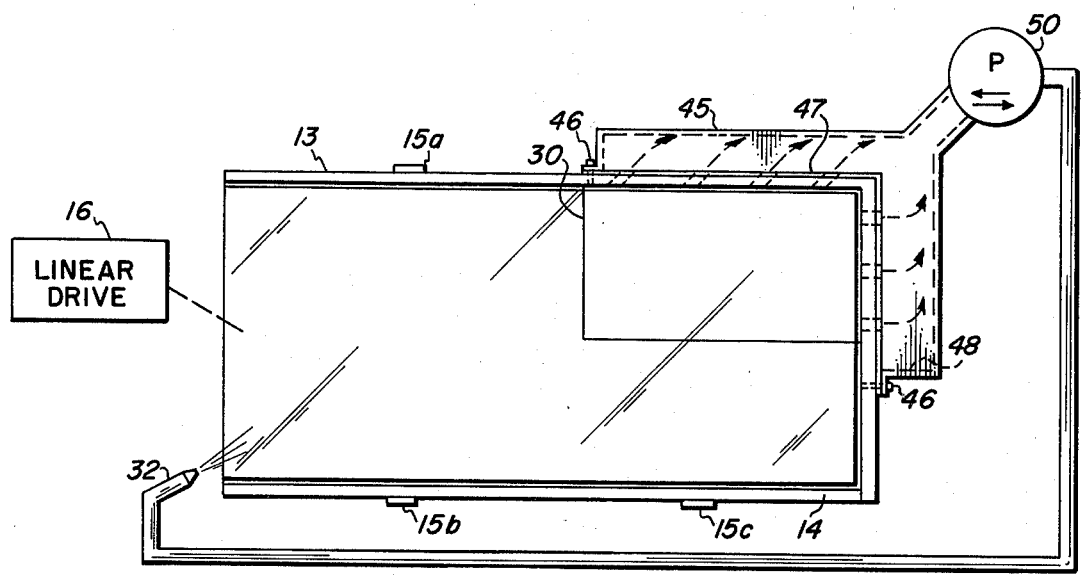
FIG. 7 is a schematic and top plan view of yet another embodiment of registration apparatus, according to the invention, a sheet being shown in a sleeve of the apparatus in a registered position.

Referring to FIGS. 5 and 7, it may be seen that FIG. 7 shows apparatus which differs from that which is shown in FIG. 5 only in that the pumps 31 and 49 have been replaced with a reversible pump 50 coupled to the nozzle 32 and manifold 45. The reversible pump may be used to rapidly move a sheet inserted into the sleeve into registration and to rapidly move a registered sheet out through the open end of the sleeve. In this connection, it should be appreciated that the term reversible pump may include apparatus having a valve arrangement which may be operated manually or automatically.

Figure 8:
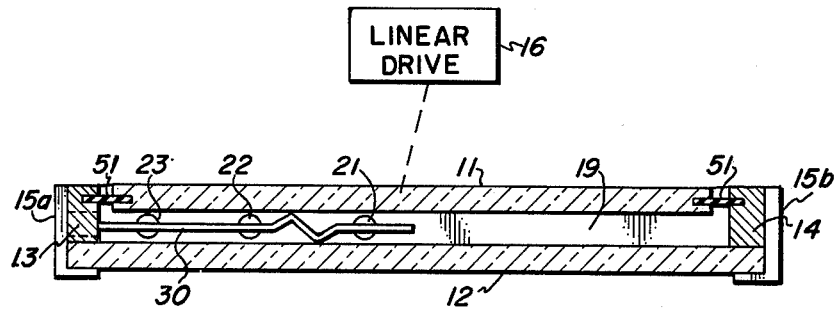
FIG. 8 is a cross-sectional view of registration apparatus, according to the invention, having a sleeve with a resiliently mounted wall.
Figure 9:
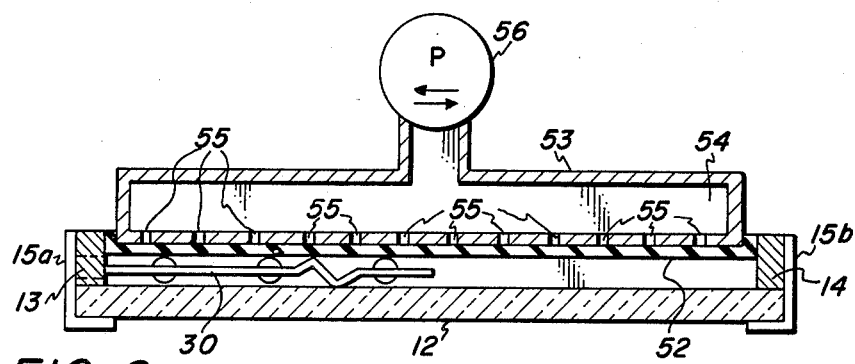
FIG. 9 is a cross-sectional view of registration apparatus, according to the invention, having a sleeve with a flexible wall.

Referring to FIG. 1, linear drive 16 may include a piston and pump arrangement connected to plate 11 for raising and lowering the plate at appropriate times, or the raising and lowering may be accomplished with an electromagnetic arrangement coupled to the plate. However, in situations where fluid leaking through the spare between plate 11 and the members against which it slides is objectionable, an elastic seal 51, see FIG. 8, may be connected between the plate 11, the elongated members 13 and 14, and the stop 19. Alternatively, as shown in FIG. 9, plate 11 may be replaced with a resilient diaphragm 52 connected to the elongated members and stop, and a structure 53 having a chamber 54 may be fitted between the elongated members and stop, the chamber 54 communicating through a plurality of holes 55 with the diaphragm 52. Near the open end of the sleeve, the diaphragm is secured to the structure such that when a pump 56 forces fluid through the holes 55, leakage does not occur, and the diaphragm expands downwardly to clamp a sheet in the sleeve. Reversal of the pump 56 permits the diaphragm to contract, thereby causing release of the clamped sheet.

It is to be understood that the description herein of preferred embodiments, according to the invention, have been set forth as examples thereof and are not to be construed or interpreted as limitations on the claims which follow and define the invention.

What is claimed is:

1. Apparatus for registering a sheet with respect to perpendicularly related axes, the sheets having a length, a width, and an effective thickness within predetermined ranges, comprising:
   a. a sleeve for internally accomodating said sheet, the sleeve having a movable side wall, and at least one point on an inner narrow wall of the sleeve being aligned in parallel with one of the axes;
   b. a stop located at one end of the sleeve, the stop having at least one point aligned in parallel with the other of the axes;
   c. means for providing in the sleeve a fluid stream having velocity components normal to each of the axes, whereby when a sheet is placed in the sleeve, the stream moves the sheet into abutment with each of said points; and
   d. means for moving the movable wall to vary the thickness of the space in the sleeve, whereby sheets having different effective thicknesses may be registered and clamped in the sleeve.

2. Apparatus as defined in claim 1 wherein said sleeve includes a pair of parallel members and a stop, and the movable wide wall is coupled thereto in a fluid tight manner.

3. Apparatus as defined in claim 2 wherein the movable wide wall is an elastic diaphragm.

4. Apparatus as defined in claim 2 wherein said means for providing a fluid stream includes at least one port in said stop and at least one port in said narrow wall.

5. Apparatus as defined in claim 3 wherein said means for providing a fluid includes a fluid source for injecting fluid into the sleeve.

6. Apparatus as defined in claim 5 wherein said means for providing a fluid includes a manifold coupled to at least one of the ports and a pump for discharging fluid from the manifold.

7. Apparatus as defined in claim 6 wherein said fluid source includes apparatus for directing fluid under pressure, and said apparatus is coupled to said pump.

8. Apparatus as defined in claim 4 wherein said pump is reversible.

9. Apparatus as defined in claim 2 wherein said sleeve includes a top plate and a bottom plate, at least one of said plates being translucent.

10. Apparatus as defined in claim 9 wherein said means for providing a fluid stream includes at least one port in said stop and at least one port in said narrow wall.

11. Apparatus as defined in claim 10 wherein said means for providing a fluid includes a fluid source for injecting fluid into the sleeve at its other end.

12. Apparatus as defined in claim 10 wherein said means for providing a fluid includes a manifold coupled to at least one of the ports and a pump for discharging fluid from the manifold.

13. Apparatus as defined in claim 4 wherein said means for providing a fluid includes a fluid source injecting fluid into the sleeve at the other end.

14. Apparatus as defined in claim 13 wherein said means for providing a fluid includes a manifold coupled to at least one of the ports and a pump for discharging fluid from the manifold.

15. Apparatus as defined in claim 4 wherein said means for providing a fluid stream includes a manifold coupled to said ports and a vacuum pump coupled to the manifold.

* * * * *